Aug. 4, 1942.   H. C. GRANT, JR   2,291,619
FLUID PRESSURE OPERATED DEVICE
Filed Feb. 3, 1940
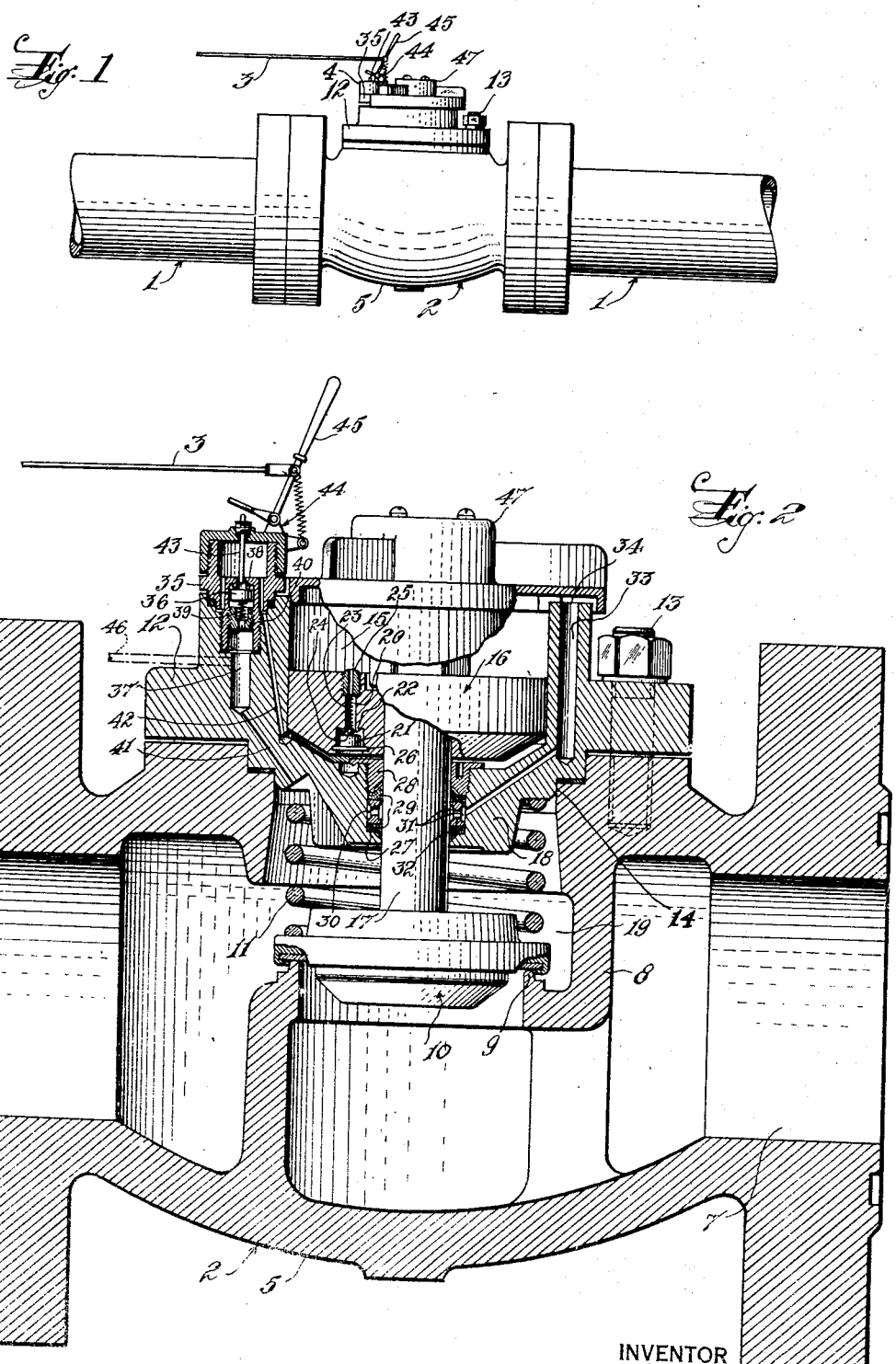
INVENTOR
BY Harry C. Grant, Jr.
ATTORNEY Patented Aug. 4, 1942

2,291,619

UNITED STATES PATENT OFFICE 2,291,619

FLUID PRESSURE OPERATED DEVICE

Harry C. Grant, Jr., New York, N. Y., assignor to Specialties Development Corporation, Bloomfield, N. J., a corporation of New Jersey Application February 3, 1940, Serial No. 317,047

1 Claim. (Cl. 137—139)

The present invention relates to fluid pressure operated devices, and more particularly to devices which are used in connection with fluid media under pressure.

The present invention, however, is not concerned with any particular use of such devices, but rather with an improved device adapted for various uses. For illustrative purposes, the invention will be shown embodied in a fluid pressure operated fluid pressure medium control device, more particularly a piston operated valve.

In working with fluid media under high pressures, as for instance with liquid carbonic acid, undesired effects have been encountered due to the impossibility of effectively sealing the operating portion of the device from the working portion thereof. In this case, fluid tight separation of the piston chamber from the valve chamber is difficult to attain because of the necessary presence of a connecting member between the operating and working elements in the respective chambers. Any leakage from the latter into the former chamber past the connecting member, will either impede or cause an undesired operation of the piston and thereby of the valve, depending on the construction of the device.

It is accordingly an object of this invention to provide a fluid pressure operated pressure fluid medium device embodied in a fluid pressure operated valve, the operating functions of which are unaffected by any leakage from the working toward the operating portion thereof or vice versa.

Since, as already mentioned, the complete prevention of leakage of fluid medium under high pressure conditions is not capable of achievement, provision has been made to render harmless, by elimination, such leakage fluid as has succeeded in getting past the ordinary sealing means along the connecting member between the chambers, this being accomplished by means to collect the leakage fluid and to vent it to the atmosphere.

It is, therefore, another object of the present invention to provide a fluid pressure operated fluid pressure medium device with leakage fluid collecting and eliminating means.

A further and more specific object of the present disclosure is to provide a high pressure fluid medium piston operated valve which has a packing arrangement associated with its piston rod adapted to prevent any undesired operation of the piston by the leakage of fluid from the valve chamber, by the elimination of such fluid as may have leaked past the packing.

These and other objects, not specifically enumerated above, will be apparent as the invention is described in greater detail in connection with the accompanying drawing, wherein:

Figure 1 is an elevational view of a valve embodying the present invention, shown connected in a fluid conduit, while Figure 2 is an enlarged view of the valve, partly in section, illustrating the valve in detail.

Referring now to Figure 1, a conduit is seen indicated at 1, in which is connected a valve 2 in a conventional manner. A remotely actuated pull cable 3 is provided for the manipulation of a valve control 4.

In Figure 2, the valve 2 of Figure 1 is shown, comprising a valve body 5 provided with a fluid medium inlet 6 and an outlet 7, separated by a partition 8 which forms an annular valve seat 9. A valve assembly 10 is seated on the seat 9 and is normally held thereon by a spring 11, the other end of which bears against the nether side of a cylinder assembly 12 which is secured to the valve body 5, by means of bolts 13, and is suitably fitted into an opening 14 in the valve body and forms a piston chamber 15. A piston assembly 16 is shown disposed in the chamber 15. A member 17, extending through a wall 18 separating the piston chamber 15 from a valve chamber 19, operatively connects the piston assembly 16 with the valve assembly 10. The piston chamber 15 is bounded at its upper portion by a closure member 47 which permits the upper portion of the piston chamber 15 to communicate with the atmosphere at 34. If desired, the member 47 may be left out altogether.

The piston assembly 16 has a vent passage 20 which is controlled by a valve check 21 adapted to seat on a valve seat 22 formed in the passage 20. The valve 21 is normally held from its seat 22 by means of a spring 23 which bears on one side against a bearing ball 24, and on its other side against an adjusting screw 25. The ball 24 bears against the upper side of the valve 21, which, in turn, rests on a pin 26, suitably secured in the piston assembly 16 for that purpose. In a conformably shaped recess 27 in the separating wall 18, and held in place therein by a gland 28, two packing rings 29 are disposed adjacent to and about the connecting member 17, and are separated by a spacer 30. The spacer is provided with annular grooves 31 which are connected by a plurality of radial passages 32. A passage 33 formed in the wall 18 connects the annular grooves 31 with the atmosphere at 34. Suitable means 35 control the admission of an operating fluid medium into the piston chamber 15 underneath the piston assembly 16. The control means comprises a valve 36 in a valve chamber 37, normally urged onto a corresponding valve seat 38 formed in the valve chamber, by means of one end of a spring 39, the other end of which bears against a spring support 40 disposed in the valve chamber 37. A passage 41 connects the main valve chamber 19 with the control valve chamber 37, while a passage 42 connects the control means 35 with the space underneath the piston assembly 16. A control valve actuating pin 43 is disposed above the valve 36 and is adapted to be actuated to unseat the valve 36 by a lever mechanism 44 secured to the outside of the control means 35. The lever mechanism 44 may be actuated remotely by means of the pull cable 3, or manually by the manipulation of a lever 45. An alternative arrangement for the supply of an operating fluid medium to the piston chamber 15 is indicated in broken lines, wherein a conduit 46 leads from an outside source into control valve chamber 37. In the alternative arrangement, the passage 41 may be dispensed with.

The operation of the device is as follows:

Upon the admission of a high pressure fluid medium through the inlet 6 into the main valve chamber 19, the valve assembly 10 will be subjected to considerable pressure tending to seat the valve assembly on its seat 9. A part of the fluid medium will succeed in leaking past the lower of the two packing rings 29. However, by being collected in the space provided by the annular grooves 31, instead of passing along the connecting member 17 underneath the piston assembly 16 and possibly operating the latter, the leakage fluid will be rendered harmless by passing through the passage 33 and to the atmosphere at 34. There may be some leakage of the fluid medium through the passage 41, past the valve 36, through the passage 42 and into the space underneath the piston assembly 16, which may lead to a similarly undesirable operation of the piston assembly 16. This contingency, however, is met by the provision of the adjustable pressure regulating device or venting valve check 21, which permits venting of the space at the under side of the piston assembly 16 to the atmosphere through the upper part of the piston chamber 15 through the vent passage 20, as long as such leakage into this space underneath piston assembly 16 is relatively slow. If, however, the control valve 36 should be actuated by a pull on the cable 3 or manipulation of the lever 45, causing the depression of the valve actuating pin 43 to unseat the valve 36, fluid medium from the main valve chamber 19, or from an outside source through the conduit 46, would enter the piston chamber 15 underneath the piston assembly 16 at such a rate as to cause a rise in pressure sufficient to seat the vent valve check 21 against the action of the spring 23, and to cause the actuation of the piston assembly 16 and thereby raise the valve assembly 10 from its seat 9 against the force of the spring 11. This provides free passage for fluid medium toward the outlet 7 of the valve 2. The adjusting screw 25 serves to variably compress the spring 23 which in turn, regulates the pressure at which the valve check 21 will close, and thus indirectly regulates the operating pressure for the piston assembly 16.

From the foregoing description, it will be seen that a fluid pressure operated fluid pressure medium device has been provided which, under high pressure conditions, is not affected in its operation by leakage as set forth in the objects of the invention.

It will be also apparent to one skilled in the art, that, while the invention has been described with reference to a specific embodiment, such as the valve disclosed herein, the invention may be utilized in connection with devices which differ in their design and application from the device disclosed herein, the basic inventive concept being found in the following claim.

I claim:

A fluid operated valve device, comprising in combination: a valve body having an inlet and an outlet and formed with a valve seat, a valve in said body on said seat, a cylinder secured to said body, a piston in said cylinder adapted to be operatively lifted from a low normal position therein by fluid pressure, adjustable piston operating pressure regulating means in said piston normally open to the atmosphere, a partitioning wall separating said cylinder and said valve body formed with a passage adapted to connect said inlet and said cylinder and with a second passage in communication with the atmosphere, a member connecting said piston with the valve and traversing said wall, a pilot valve disposed adjacent said wall for the control of said passage from the inlet to said cylinder, sealing means disposed in said wall adjacent said connecting member having leakage fluid medium collecting means in communication with said passage in the wall leading to the atmosphere, and control means for said pilot valve disposed adjacent thereto.

HARRY C. GRANT, Jr.